United States Patent

Bouillie et al.

4,012,149
Mar. 15, 1977

[54] MEASURING METHOD AND EQUIPMENT FOR LOCATING A BREAK IN AN OPTICAL CABLE

[76] Inventors: Rémy A. Bouillie, route de Treguier, Lannion, France, 22300; Pierre Lamouler, Maudez, Lanvellec, France, 22420

[22] Filed: July 1, 1975

[21] Appl. No.: 592,167

[30] Foreign Application Priority Data

July 26, 1974  France .................. 74.25993

[52] U.S. Cl. .................. 356/237; 350/96 C; 356/239
[51] Int. Cl.² .................. G01N 21/16; G01N 21/32
[58] Field of Search .................. 356/4, 5, 237, 239; 250/227, 562, 572; 350/96 C; 324/52

[56] References Cited

UNITED STATES PATENTS

| 3,402,630 | 9/1968 | Blau et al. .................. 356/5 |
| 3,728,026 | 4/1973 | Idestrom et al. .................. 356/5 |
| 3,743,419 | 7/1973 | Skagerlund .................. 356/5 |
| 3,884,585 | 5/1975 | Lebduska .................. 356/239 |

OTHER PUBLICATIONS

Pulse Radar Used to Locate Faults, Mendenhall, Electrical World, Nov. 6, 1948, pp. 88 and 91.

*Primary Examiner*—Vincent P. McGraw

[57] ABSTRACT

A method essentially consisting in measuring the duration of the go and return travel of a light impulse between an accessible end of an optical cable and a break in the said cable. The distance of the break from the latter end can be calculated if the refractive index of the light conducting material is known. The equipment essentially comprises a source of light impulses forming optical signals, an injector element coupling the source to the cable, a separator dividing each optical signal into two signals respectively traveling on a first and a second path, the latter of which includes the above-mentioned go and return travel, detector elements detecting the signals at the outputs of their paths, and a viewing element displaying the detector outputs on a common screen.

2 Claims, 9 Drawing Figures

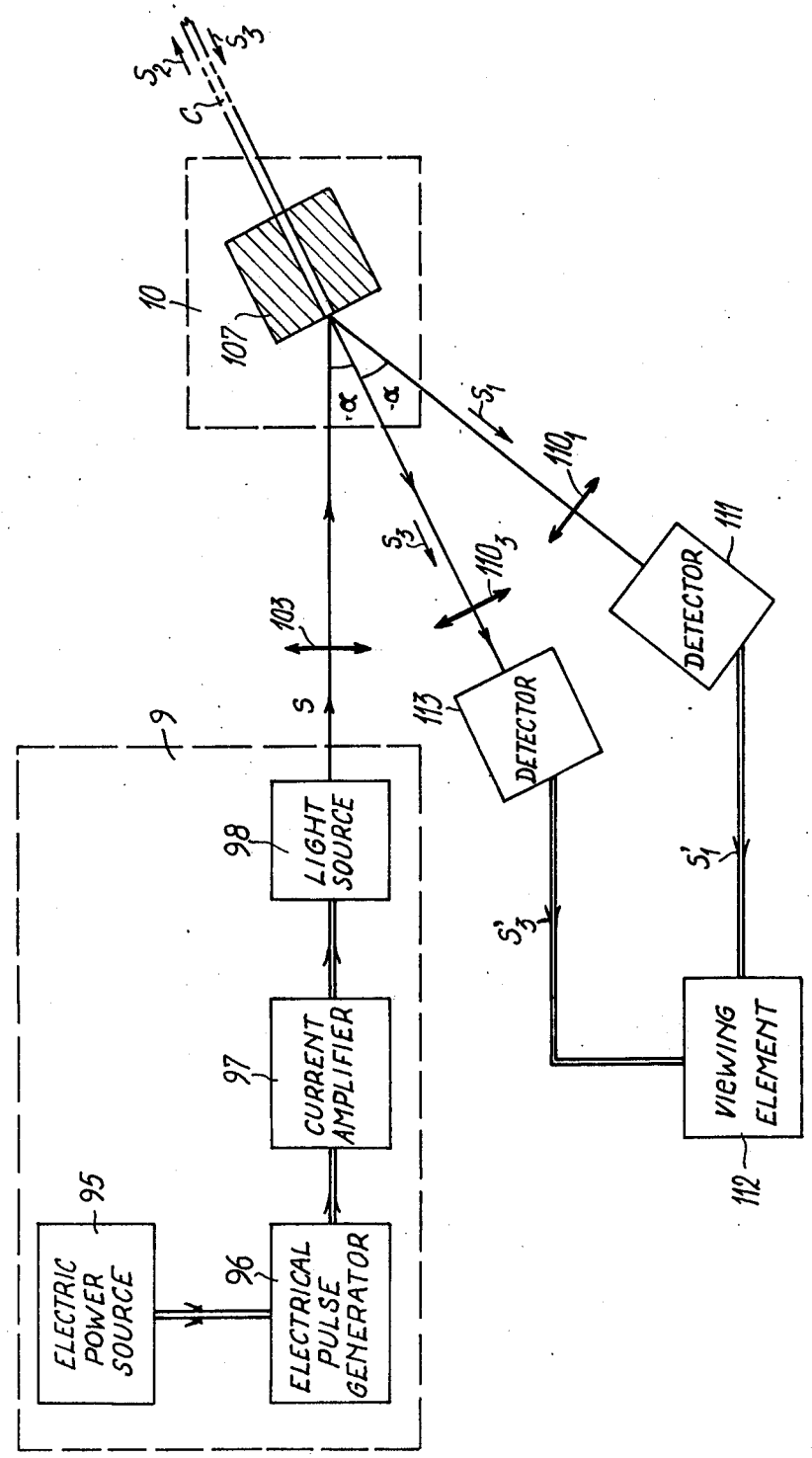

4,012,149

MEASURING METHOD AND EQUIPMENT FOR LOCATING A BREAK IN AN OPTICAL CABLE

CROSS REFERENCE TO RELATED APPLICATIONS

Applicants hereby make cross reference to their French Patent Application PV 74-25993, filed July 26, 1974 and claims priority thereunder following the provisions of 35 U.S.C. 119.

BACKGROUND OF THE INVENTION

1. Field of the Invention

The present invention relates to measuring apparatus for locating a break in one or more optical fibres of an optical cable.

2. Description of the Prior Art

It is known that the very low attenuation for optical wavelengths of dielectric elements has suggested the use of these elements in light transmission systems over more or less long distances. In such systems, the conditions of use of these dielectric elements necessitate a protection or a covering in the form of a cable sheath.

One or more of the dielectric elements or optical fibres constituting the cable may break because of defective handling, or for any other reason, without the outer appearance of the cable revealing the point where such break has occurred.

What one can call "the cable to be measured" may be constituted by a single optical fibre; that is to say, an element composed of one or more dielectric materials such as glass, silica, liquid plastic material and so on, which is capable of conducting light. This optical fibre will normally form a part of a conductor constituted by one or more fibres required to transmit the same signal along parallel paths, that is a cabling element constituted by one or more conductors, or even a complete cable constituted by one or more cabling elements.

SUMMARY OF THE INVENTION

In order to solve the problem of break position detection, the present invention proposes an apparatus means characterized in that its operation consists essentially in making a measurement of the duration $(t_1-t_0)$ of passage of a light impulse to and from one accessible end of the cable and the said break along a length or of the cable by applying the formula $$L = \frac{c(t_1 - t_0)}{2n}$$

to extract therefrom L, c being the velocity of light in vacuo and n the refractive index of the material constituting the broken fibre.

OBJECTS OF THE INVENTION

An object of the present invention is to provide for the embodiment of the proposed apparatus described hereinafter. A generator of light pulses includes a laser source of a train of recurrent short light pulses S toward an end of the optical cable, an electrical pulse generator, means for feeding electrical power to the pulse generator and an amplifier connecting the pulse generator and the laser source. Directing and focusing means collimates the train of recurrent short light pulses S through a distributing device to the end of the optical cable to be tested. The distributing device is located along the emitting optical axis of the light pulses common to the laser source and the directing and focusing means. This distributing device divides the train of light pulses S into a first train of non-delayed light pulses $S_1$ along a first optical path and a second train of non-delayed light pulses $S_2$ along a second optical path to the break of the optical cable, and is travelled by a third train of delayed light pulses $S_3$ along a third optical path reflected from the second train of light pulses $S_2$ by the break in a fiber of the optical cable. A first detector including a first electro-optical transducer receives the first train of light non-delayed pulses $S_1$ and converts the first train of light pulse $S_1$ into a first electrical signal $S_1'$. A second detector including a second electro-optical transducer receives the third train of delayed light pulses $S_3$ and converts the third train of delayed light pulses $S_3$ into a second electrical signal $S_3'$. Electrical time measurement means receive the first and second electrical signals $S_1'$, $S_3'$ and measure the time delay interval $(t_1-t_0)$ between a non-delayed light pulse of the first train $S_1$ and a delayed light pulse of the third train $S_3$ thereby determine the position of the break in a fiber of the optical cable.

BRIEF DESCRIPTION OF THE DRAWING

The invention will be better understood on reading the following description of some of its embodiments and on examining the corresponding attached drawings in which:

FIG. 3 is a block diagram illustrating the principle of operation of an apparatus including the distributing device shown in FIG. 2b; according to the invention.

DESCRIPTION OF THE PREFERRED EMBODIMENT

Figure 1A:
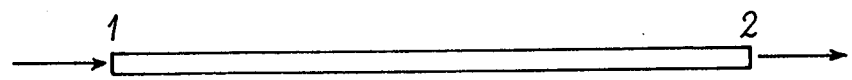
FIGS. 1a and 1b are respectively showing an optical fibre without a break and an optical fibre having a break.

If, using an unbroken optical cable (FIG. 1a) a light impulse is injected at the input end 1 of a fibre, this impulse is transmitted to its output 2.

Figure 1B:
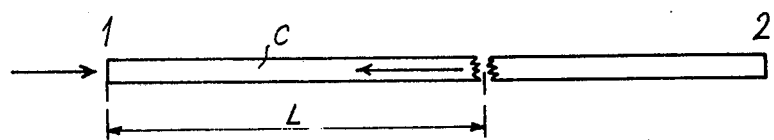

If the same optical fibre has a break (FIG. 1b), there is created at the place of breaking a diopter between a medium of refractive index $n$ (that of the optical fibre) and a medium exterior to the fibre (generally the air). A light impulse injected at the input 1 of the fibre has a certain portion reflected by this diopter and is returned to end 1. If therefore, a light impulse is injected at the end 1 at the instant $t_0$ one can collect at the same end a reflected impulse at the instant $t_1$, such that $$t_1 - t_0 = \frac{2nL}{c}$$

where L is the distance separating the break from the end 1 and c is the speed of light in vacuo. This expression can be written:

$$L = c(t_1 - t_o)/2n$$

where permits of locating the break.

To measure the time interval $(t_1 - t_o)$, use is made of an apparatus for dividing an optical signal S of recurrent light with a determined repetition frequency into a first and a second non-delayed optical signals $S_1$, $S_2$, the signal $S_2$ being transmitted into the optical cable c to be measured, and for displaying the non-delayed signal $S_1$ and a delayed signal $S_3$ reflected from the optical signal $S_2$ by the break of the optical cable C.

Figure 2:
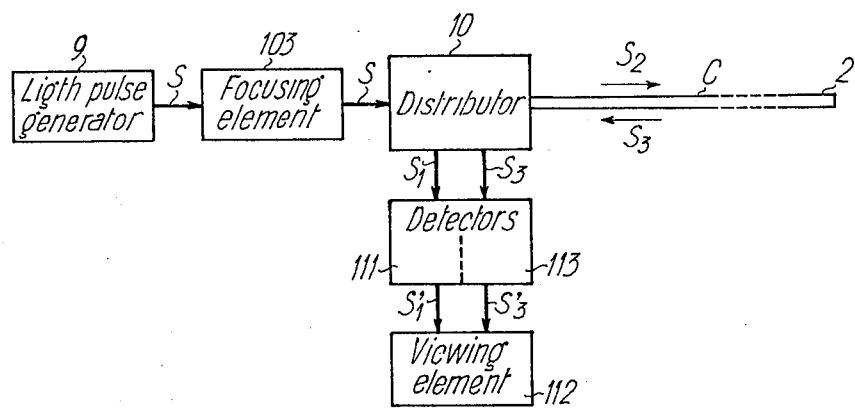
FIG. 2 is a block diagram illustrating the principles of operation of an apparatus according to the invention.

In a general manner, this apparatus is shown in FIG. 2 and comprises a generator 9 generating the optical signal S, a distributing device 10 receiving the signals S, $S_3$ and distributing the signals $S_1$, $S_2S_3$, two detector elements 111, 113 of signals $S_1$, $S_3$ and a viewing element 112. This apparatus may be a mechanically stable, sealed unit block.

The generator 9 emits sufficiently short light impulses; that is to say, of duration clearly less than the value $(t_1 - t_o)$ to be measured and constituting the optical signal S. The repetition frequency of these impulses may be fixed or variable. A light pulse source included in the generator 9 is, as desired, either a gas laser or a solid laser comprising a cell effecting a blocking of modes, such as an electroluminescent diode or an electroluminescent diode having a laser effect (laser diode).

It is however, advantageous to choose the wavelength emitted by the source in a band of wavelengths in which the cable to be measured has minimum attenuation.

A focusing element 103 collimates the light pulses of the signal S through the distributing device 10 at the input of the cable C to be measured. This may be, at will, a simple lens, a system of lenses such as a microscope objective, a lens with an index gradient, or any other suitable system for the focussing of light.

The detector elements 111, 113 (here shown as merged into a single one including each an electro-optical transducer converting the non-delayed optical signal $S_1$ and delayed optical signal $S_3$ into electrical signals $S_1^1$, $S_3^1$ respectively.

These detectors in a general manner, may each be a photodiode, a cascade photodiode, a photo-multiplier or any other suitable detector element. These two detectors 111, 113 are not necessarily of the same kind, but where different, however, they should have equivalent time characteriztics (such as response time and rise time) so as not to compromise the precision of the measurement. It is to be noted, however, that the detector element 111 is not absolutely necessary; in fact, any generator of electric signal synchroneous with the optical emission (an electric light impulse control generator, for example) may be used as the element 111. In this case, there is no need to use the separator element 105.

The viewing element 112 displays the electrical signals $S_1^1$, $S_3^1$ on a single screen for viewing the measurement.

The distributing device 10 allows the optical signal S transmitted from the preceding focusing element 103 to be divided into the two non-delayed optical signals $S_1$ and $S_2$. A first optical path between the device 10 and the detector element 111 is travelled by the optical signal $S_1$ and a second optical path between the device 10 and the break of the optical cable C is travelled by the optical signal $S_2$. A third optical path travelled by the delayed optical signal $S_3$ issued from the reflection of the optical signal $S_2$ by the break of the optical cable C passes through the device 10 to the detector element 113.

In this end, the distributing device 10 comprises an an object carrier 107 which fixes the optical cable C to be measured at the focus of the focus element 103. The object carrier 107 is formed to be capable of being adaptable to all the possible types of optical cables. This object carrier transmits the non-delayed signal $S_2$ to the cable C and receives the delayed reflected optical signal $S_3$ from the break of the optical cable C.

In addition, the object carrier 107 or another elements incuded in the distributing device 10 receive the optical signal S and divide this signal S into the signals $S_1$ and $S_2$ directly transmitted to the detector 111 and the object carrier 107. In accordance with the present invention, three embodiments of the distributing device 10 are represented in the FIGS. 2a, 2b and 2c, as hereinafter explained.

Figure 2A:
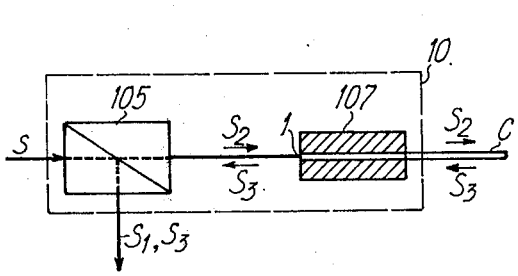
FIG. 2a, 2b and 2c, respectively, are block diagrams illustrating the principles of operation of three types of distributing device including each in an apparatus according to the invention.

As shown in FIG. 2a, a first type of distributing device 10 comprises a separator element 105 which divides the optical signal S into the two non-delayed optical signals $S_1$ and $S_2$ travelling the first and second optical paths. In this case, the object carrier 107 fall into line with the light axis of the generator 9 through the separator element 105, receives and transmits the nondelayed optical signal $S_2$ and the delayed optical signal $S_3$ from and to the separator element 105.

The separator element 105 transmits also the signal $S_3$ along the third optical path to the detector element 113. In this end, this element 105 is advantageously provided with antireflective layers on certain of its faces to avoid parasitic reflections.

Figure 2B:
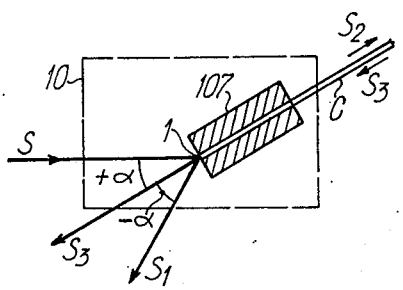
Figure 2C:
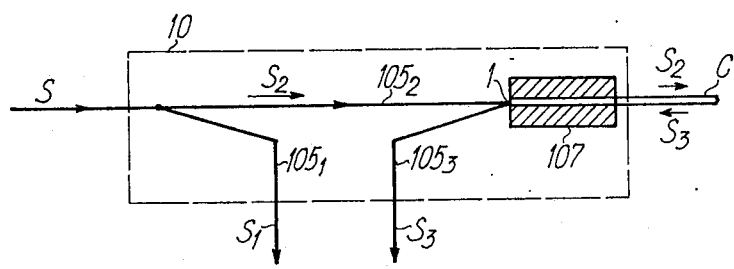

A second type of distributing device 10 shown in FIG. 2b differs from the preceding one in that the axis of the cable C to be measured is disposed on the object carrier 107 so as to make an angle $\alpha$ with the optical axis defined by the source 101 and the focus element 103. It result therefrom that the light signal S issued from the focus element 103 gives rise to a first non-delayed signal $S_1$ reflected from the input end 1 of the cable to be measured and which travels on a first path forming an angle $2\alpha$ with the incident signal path, and to a non-delayed second signal $S_2$ transmitted through the object carrier 107 and which travels on the second optical path to the break of the optical cable C. Also, a third delayed optical signal $S_3$ is reflected from the break in the cable and which travels on a third path forming an angle $\alpha$ with the incident signal path through the object carrier 107 to the detector element 113. A third type of distributing device 10 shown in FIG. 2c differs from the two preceding ones in that the light signals issued from the focus element 103 is divided at the output of this element 103 into a first and second non-delayed optical signals $S_1$, $S_2$ respectively along a first and a second optical fibers $105_1$, $105_2$ of small diameter constituting a first optical path to the detector element 111 and a second optical path to the object carrier 107 and the optical cable C. Also a third delayed optical signal $S_3$ is reflected from the break of the optical cable C and travels on the third optical path through the object carrier 107, the end of which transmits through a third optical fiber $105_3$ the optical signal $S_3$ to the detector element 113.

EXAMPLE (FIG. 3)

In the following example, it is assumed that, in the cables to be measured, the minimum attenuation is between 8000 and 9000 A of wavelength. Consequently, there is selected as source of light impulses a laser diode emitting on such a wavelength.

The distributing service selected is that of the second type (FIG. 2b). The elements of the light pulses generator 9 of the apparatus are as follows:

A source 98 of light impulses is constituted by a laser diode emitting, on the said wavelength, light impulses of a duration of five nanoseconds, the peak power emitted being a few hundred of milliwatts: a generator 96 delivering electrical pulses of variable and adjustable frequency in a wide range comprised from a few hertz to a few hundreds of megahertz; an electric power source 95 feeding the generator 96; a current amplifier 97 connecting the generator 96 and the light source 98 and supplying an adjustable current of several amperes capable of exciting any type of laser diode included in the light source 98.

The focus element 103 is a microscope objective of magnification 10.

The object carrier 107 permits the adjustment of the position of the optical cable C be measured so that its axis fall into line with the optical axis of the detector element 113 and forms two angles $\alpha$ of about 5° with the optical axis common to the the light source 98 and the focus element 103 and with the optical axis of the detector element 111. The electro-optical transducers of the detector elements 111, 113 are two cascade diodes of the same type, having consequently the same response time and the same rise time. Both are loaded by 50 ohms. These detector elements are preceded by two microscope objectives $110_2$ and $110_3$, respectively, which focus the respective non-delayed optical signal $S_1$ and delayed optical signal $S_3$ on the said detector elements.

The viewing element 112 is an oscilloscope.

Figure 4A:
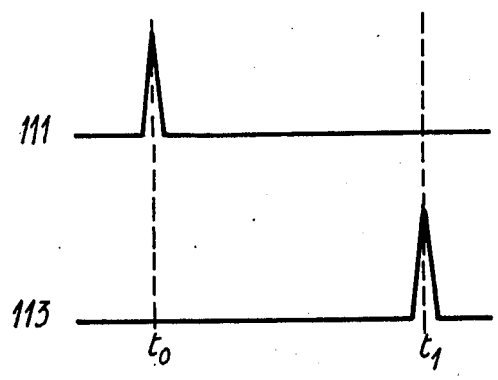
FIGS. 4a and 4b are respectively time graphs illustrating two methods of measurement according to the invention.

Two methods may be utilized for effecting the measurement. In a first method (FIG. 4a), the interval of time $(t_1-t_0)$ is measured by direct reading on the screen of the oscilloscope.

Figure 4B:
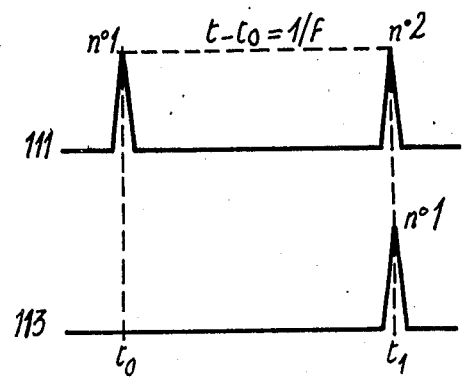

In a second method (FIG. 4b) a souce of light impulses of variable and adjustable repetition frequency is used and the frequency thereof is so adjusted that what is seen on the screen of the oscilloscope is the delayed impulse No. 1 detected by the detector element 113, coinciding in time with the non-delayed impulse No. 2 detected by the element 111. One then benefits from a better precision as the delay sought $(t_1-t_0)$ is given by the reciprocal of the frequency of measurement.

By means of the apparatus according to the invention especially if the distributing device of the second type (FIG. 2b) is used in the method by coincidence (FIG. 4b), one may measure $(t_1-t_0)$ with a very great precision. Any error in L is then only due to the imprecision in the value of the refractive index $n$, measured or given.

The error due to such imprecision on n can be eliminated if one can make use of a cable of length L' having the same refractive index as the cable to be measured. A first measurement made on a signal passing from end to end through such a cable, gives $$n = c(t_1'-t_0')/L'$$

A second measurement taken on the broken cable in accordance with the invention gives $$L = c(t_1-t_0)/2n$$

whence:

$$L = \frac{(t_1-t_0)}{(t_1'-t_0')} \frac{L'}{2}$$

The absolute precision thus obtained depends on the length measurement L' and is of the order of magnitude of 1 meter.

What we claim is:

1. An apparatus for determining the position of a break in a fiber of an optical cable comprising:
   generating and directing means providing a train of recurrent light pulses toward an end of said optical cable;
   said generating means including a laser source of said recurrent light pulses, an electrical pulse generator, means to feed electrical power to said generator and an amplifier connecting said generating means and said laser source;
   an optical separator means located along the emitting axis of said light pulses generated from said laser source comprising at least a first, a second and a third optical fiber for dividing said train of said light pulses into a first train of light pulses along said first optical fiber, a second train of light pulses along said second optical fiber, and for reflectively directing a third train of light pulses along said third optical fiber;
   optical concentrator means for directing said second train of light pulses to the end of the optical cable being tested;
   first receiving means including a first electro-optical transducer for receiving said first train of light pulses and converting said first train of light pulses into a first electrical signal;
   second receiving means including a second electro-optical transducer for receiving said third train of light pulses reflectively along said third optical fiber of said optical separator means after said second train issues from said second optical fiber and is reflected from said second train of light pulses by a break in the fiber of said optical cable;
   said second receiving means converting said third train of light pulses into a second electrical signal; and,
   electrical time measurement means receiving said first and second electrical signals for measuring the time delay interval between a light pulse of said first train and a light pulse of said third train to thereby determine the position of the break in a fiber of said optical cable.

2. An apparatus for determining the position of a break in a fiber of an optical cable as claimed in claim 1, wherein said electrical pulse generator comprises manual means for controlling the repetition frequency of light pulses of said first train to thereby track the successive light pulse of said first train with the light pulse of said third train and thereby determine the position of the break in the optical cable from the observed repetition frequency.

* * * * *